(12) United States Patent
Schroll et al.

(10) Patent No.: US 6,819,831 B1
(45) Date of Patent: Nov. 16, 2004

(54) ADJUSTABLE, RECONFIGURABLE, MULTI-PORT OPTICAL FIBER COUPLER

(76) Inventors: Kenneth R. Schroll, 219 Longwood Ave., Chatham, NJ (US) 07928; James P. Waters, Two Ashwood Trail, Boonton Township, NJ (US) 07005; Janet Armstrong, 23 Hexham Dr., Somerset, NJ (US) 08873

( * ) Notice: Subject to any disclaimer, the term of this patent is extended or adjusted under 35 U.S.C. 154(b) by 183 days.

(21) Appl. No.: 10/090,329

(22) Filed: Mar. 4, 2002

(51) Int. Cl.[7] .............................................. G02B 6/26
(52) U.S. Cl. ........................................ 385/25; 385/65
(58) Field of Search .................. 385/25, 31, 60–62, 385/65, 16

(56) References Cited

U.S. PATENT DOCUMENTS

| | | | |
|---|---|---|---|
| 3,208,342 A | 9/1965 | Nethercot, Jr. .................. 88/61 |
| 4,134,640 A | 1/1979 | Auracher et al. ........ 350/96.15 |
| 4,164,364 A | 8/1979 | Witte ...................... 350/96.17 |
| 4,243,297 A | 1/1981 | Elion ...................... 350/96.15 |
| 4,402,568 A | 9/1983 | Kulich et al. ............. 350/96.16 |
| 4,511,207 A | 4/1985 | Newton et al. ........... 350/96.15 |
| 4,514,057 A | 4/1985 | Palmer et al. ............ 350/96.15 |
| 4,720,161 A | 1/1988 | Malavieille ............... 350/96.15 |
| 4,723,827 A | 2/1988 | Shaw et al. .............. 350/96.15 |
| 4,813,757 A | 3/1989 | Sakano et al. ........... 350/96.14 |
| 4,859,022 A | 8/1989 | Opdahl et al. ............. 350/96.2 |
| 4,889,403 A | 12/1989 | Zucker et al. ........... 350/96.15 |
| 4,911,520 A | 3/1990 | Lee .......................... 350/96.2 |
| 4,938,552 A | 7/1990 | Jebens et al. ............. 350/96.2 |
| 4,946,236 A | 8/1990 | Dautartas et al. .......... 350/96.2 |
| 4,966,432 A | 10/1990 | Okada et al. ............ 350/96.15 |
| 4,991,922 A | 2/1991 | Dahlgren ................. 350/96.15 |
| 5,035,482 A | 7/1991 | ten Berge et al. ......... 350/96.2 |
| 5,098,459 A | 3/1992 | Fukuma et al. .............. 65/4.21 |
| 5,110,194 A * | 5/1992 | Zurfluh ......................... 385/15 |
| 5,175,776 A | 12/1992 | Lee .............................. 385/16 |
| 5,253,310 A | 10/1993 | Delbare et al. ............... 385/14 |
| 5,321,774 A | 6/1994 | Barnard et al. ............... 385/16 |
| 5,546,484 A | 8/1996 | Fling et al. .................... 385/16 |
| 5,796,888 A | 8/1998 | Furukawa et al. ............ 385/22 |
| 5,832,149 A | 11/1998 | Omizu et al. ................. 385/20 |
| 5,864,643 A | 1/1999 | Pan .............................. 385/33 |
| 5,920,665 A | 7/1999 | Presby ........................ 385/16 |
| 6,031,947 A | 2/2000 | Laor ............................ 385/22 |
| 6,044,186 A | 3/2000 | Chang et al. ................. 385/23 |
| 6,175,675 B1 * | 1/2001 | Lee et al. ..................... 385/50 |
| 6,516,131 B1 * | 2/2003 | Tullis ......................... 385/137 |

* cited by examiner

*Primary Examiner*—Michael G. Lee
*Assistant Examiner*—Jamara A. Franklin
(74) *Attorney, Agent, or Firm*—Howrey Simon Arnold & White, LLP; Andrew R. Sommer

(57) ABSTRACT

A multi-port optical coupler applies the transition loss principle to exchange light among optical fibers through optical fiber bends. In a four-port embodiment, the coupler includes first and second injector fibers located in precise optical alignment on a substrate. A continuous fiber segment is configured so that a portion thereof is positioned on the substrate between and in optical alignment with the injector fibers. This portion of the fiber segment can be moved to a second position out of alignment with the injector fibers. First and second depressors impart first and second bends to portions of the fiber segment adjacent to and in optical alignment with the first and second injector fibers. Light can be injected into or extracted from the fiber segment through these bends by the injector fibers when the fiber bend is severe enough to create a transition loss and when the bends are in optical alignment with the injector fibers. The depressors can be adjustable to allow independent adjustment of the first and second bends and, therefore, the respective transition loss. When the bends are moved out of alignment with the injector fibers or are relaxed so that the transition loss is extinguished, the coupler is in effect turned off.

19 Claims, 2 Drawing Sheets

ADJUSTABLE, RECONFIGURABLE, MULTI-PORT OPTICAL FIBER COUPLER

BACKGROUND OF THE INVENTION

1. The Technical Field

The present invention is directed to the field of fiber optics. More particularly, the present invention is directed to an adjustable multi-port optical fiber coupler.

2. The Prior Art

Although four-port fiber optic couplers are known in the art, conventional four-port couplers generally are not readily adjustable. The most common way to fabricate a four-port fiber optic coupler having ports (or legs) A, B, C and D in commercial practice is to: (1) remove a section of the coating from each of two segments of single-mode optical fiber; (2) twist the uncoated fiber sections about each other; (3) heat the fiber sections until they soften; and (4) draw the glass structure axially to reduce the overall fiber diameter. When the overall fiber diameter is sufficiently reduced, some portion of the light propagating in one fiber couples into the other fiber. During the drawing process, light can be propagated in one of the fibers, and the fraction of light coupled to the other fiber can be monitored to precisely control the process, so that couplers with specified coupling performance can be produced. The portions of the first fiber adjacent the uncoated section embody legs A and B of the resulting four-port coupler and the portions of the second fiber adjacent the uncoated section embody ports C and D. Light can be coupled between diagonally opposite legs A and D and/or between diagonally opposite legs B and C of the coupler.

Heating (or cooling) the foregoing structure to a temperature different from the fabrication temperature can change the refractive index of the constituent single mode fibers sufficiently to simultaneously adjust the A/D and C/B coupling or effectively turn the device on or off, i.e., eliminate any fiber-to-fiber coupling. However, maintaining such a device in either the on or off condition, if different from the device fabrication condition, or holding a coupling setting different from that occurring at the device fabrication temperature requires continuous power to maintain the temperature corresponding to the desired condition and/or the desired amount of coupling. Another drawback to this type of coupler is that the A/D and B/C couplings are not independently adjustable.

It would be desirable to provide a multi-port optical fiber coupler that allows efficient and independent adjustment of the respective couplings between pairs of diagonally adjacent legs and which allows efficient and selective complete decoupling without affecting the foregoing adjustments.

SUMMARY OF THE INVENTION

The present invention preferably is embodied as a novel four-port fiber optic coupler having legs A, B, C and D that can allow independently adjustable coupling between diagonally opposite legs, for example, legs A/D and C/B, and that can allow for complete decoupling without affecting the foregoing adjustments. That is, the coupler can be adjusted to provide a desired, predetermined amount of coupling between legs A/D and/or C/B. The coupler also can be turned off so that all A/D and C/B coupling is extinguished. The coupler then can be turned back on with the original A/D and/or C/B coupling settings intact.

A coupler according to a preferred embodiment of the present invention includes a continuous fiber segment and first and second injector fibers. The continuous fiber segment has first and second legs A and B, which embody legs A and B of the coupler. The first and second injector fibers embody legs C and D of the coupler.

The injector fibers can include lenses for focusing light to be injected into the continuous fiber segment and to facilitate collecting light to be extracted from the continuous fiber segment. The injector fibers preferably are located on a substrate in optical alignment with respective portions of the continuous fiber segment. In a preferred embodiment, one or more alignment grooves are provided to facilitate this alignment.

In a preferred embodiment, a first depressor is provided to deflect leg A of the continuous fiber segment, thus forming a bend therein, and a second depressor is provided to deflect leg B of the continuous fiber segment, thus forming a bend therein. First and second injector fibers are positioned to direct light at the respective bends thus formed; preferably, the first and second injector fibers are positioned to direct light at the respective transitions from straight to curved fiber. The first and second depressors are independently adjustable. That is, they can be independently manipulated to independently adjust the curvature of the respective bends they impart to legs A and B of the continuous fiber segment. The amount of optical coupling between legs A/D and C/B is a function of the curvature of these bends. In this manner, the first and second depressors can selectively adjust the coupling between diagonally opposite legs of the device.

An adjustable clamp selectively toggles a portion of the continuous fiber segment to selectively extinguish the coupling between the continuous fiber segment and the first and second injector fibers. The coupling can be extinguished by moving the continuous fiber segment out of optical alignment with the first and second injector fibers and/or by relaxing the bends imparted to legs A and B of the continuous fiber segment. The toggling distance can be as little as one fiber diameter or less. Preferably, the foregoing portion of the continuous fiber segment lies in the alignment groove when in the "on" position. Preferably, the alignment groove is sufficiently deep so that the foregoing portion of the continuous fiber segment remains at least partially within the groove even when toggled to the "off" position.

Several couplers according to the present invention can be ganged together and controlled as a unit. That is, the on-off function of several couplers can be tied together, and the first and second depressors of the several couplers can be tied together, so that a single on-off control can be used to turn all of the couplers on or off simultaneously, and so that a single pair of adjusters can adjust the A/D and C/B couplings of all of the couplers simultaneously. Also, several such couplers can be ganged together as a unit, but controlled independently. In yet another embodiment, the depressor settings and clamp can be fixed so as to yield a four-port coupler having fixed coupling properties.

In alternate embodiments, a coupler according to the present invention need not have four ports. For example, the present invention can be embodied as a three-port coupler having legs A, B, and C that can allow adjustable coupling between diagonally opposite legs, for example, legs C and B, and that can allow for complete de-coupling without affecting the foregoing adjustment. Other alternate embodiments are possible, as well.

DETAILED DESCRIPTION OF THE DRAWINGS

The present invention employs the principles of co-pending and commonly assigned U.S. patent applications Ser. No. 09/997,879, entitled "Bend-Type Fiber Optic Coupler," filed on Nov. 30, 2001 and Ser. No. 10/038,396, entitled "Single Mode Light Injector/Extractor for Multiple Optical Fibers," filed on Jan. 2, 2000. The foregoing disclosures are incorporated herein by reference.

In a preferred embodiment, the present invention addresses the problem of realizing a reconfigurable, four-port, single mode optical fiber coupler in which the amount of coupling between diagonally opposite legs is separately adjustable. The present invention is based on an implementation of what is known as the "transition effect." The transition effect occurs in an optical fiber at a location of curvature discontinuity, such as a transition from straight fiber to curved fiber. This location is referred to as the transition point. The transition loss is defined as the amount of light that can be injected into or extracted from the fiber at the transition point. The transition loss is a function of the curvature (or radius) of the bend at the transition point. The greater the curvature (or the smaller the bend radius) at the transition point, the greater the transition loss.

In a preferred embodiment, the present invention stimulates the transition effect in an optical fiber by holding a portion of the optical fiber in a straight configuration, and laterally displacing an adjacent portion of the fiber so as to form a bend in the fiber. So configured, the optical fiber exhibits the bending characteristics of a cantilever beam. That is, the maximum curvature (or minimum bend radius) imparted to the fiber occurs at the transition from straight to curved fiber. Further, for a given lateral deflection, the maximum curvature is a function of the cantilever length, i.e., the length of the fiber between the straight/curved transition and the point of deflection. For a given deflection, as the cantilever length increases, the maximum curvature decreases, and vice versa.

Figure 1:
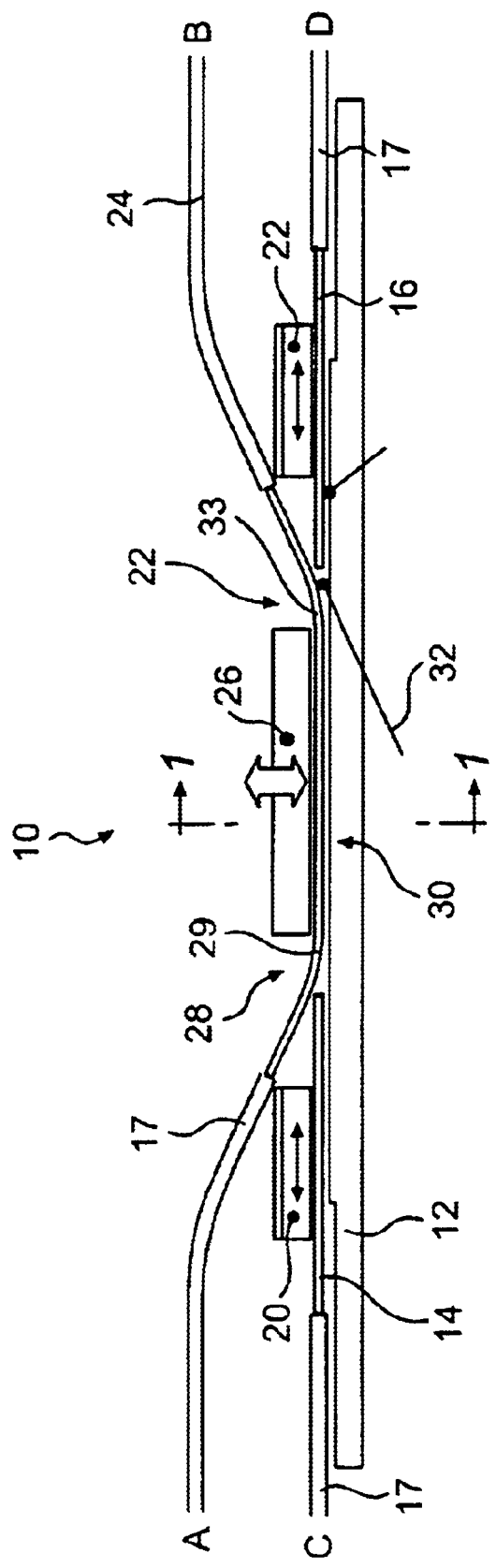
FIG. 1 illustrates an adjustable, four-port optical coupler according to a preferred embodiment of the present invention.

FIG. 1 illustrates an adjustable four-port fiber optic coupler 10 having ports A, B, C and D according to a preferred embodiment of the present invention. The first and second ports A and B, respectively, of coupler 10 are embodied as legs A and B of optical fiber 24. The third port C of coupler 10 is embodied as first injector fiber 14, and the fourth port D of coupler 10 is embodied as second injector fiber 16. Fiber segment 24 and first and second injector fibers 14 and 16 preferably are embodied as single mode optical fiber. First and second injector fibers 14 and 16 can include a lens (not shown), as would be known to one skilled to the art, to facilitate focusing and collecting light, as will be discussed further below.

Figure 4:
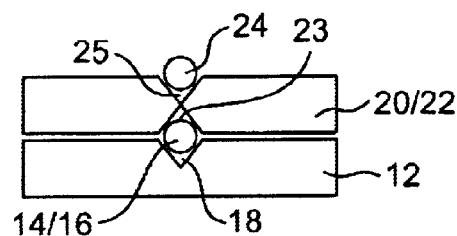
FIG. 4 is an end elevation view of a substrate and depressor according to a preferred embodiment of the present invention as shown in FIG. 1.

In the preferred embodiment shown in FIG. 1, first and second injector fibers 14 and 16 are located a predetermined distance apart in alignment groove 18 of substrate 12 (see also FIG. 4). Preferably, substrate 12 and alignment groove 18 are embodied as a commercial silicon v-groove chip. In alternate embodiments, substrate 12 can be made of any suitable material and alignment groove 18 can be formed therein by any suitable process. Alignment groove 12 can be a single, continuous groove, or it can be embodied as two or more distinct co-linear grooves. Alignment groove 18 facilitates the optical alignment of various components of coupler 10, as will be discussed in greater detail below. In alternate embodiments, other alignment means can be used.

Figure 5:
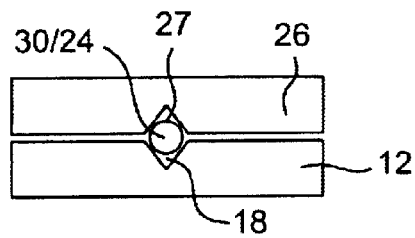
FIG. 5 is a cross-sectional view of a substrate and adjustable clamp according to a preferred embodiment of the present invention, taken along line 1—1 as shown in FIG. 1.

Adjustable clamp 26 can toggle a portion 30 of fiber segment 24 between an "on" position wherein portion 30 preferably is located in the portion of alignment groove 18 between first and second injector fibers 14 and 16, and an "off" position wherein portion 30 is displaced at least a small distance from the "on" position, as further discussed below. With the device in the on condition, first and second injector fibers 14 and 16 are located in optical alignment with, and preferably are directed at, transition points 29 and 33, as will be discussed further below. Preferably, adjustable clamp 26 toggles portion 30 of fiber segment 24 in a direction substantially perpendicular to substrate 12. Preferably, adjustable clamp 26 is a silicon v-groove chip having a positioning groove 27 (see FIG. 5) for facilitating the positioning of portion 30 of fiber segment 24. Alternatively, clamp 26 can be made of other material and need not have a positioning groove.

When portion 30 of fiber segment 24 is in the on position, first depressor 20 imparts a bend 28 into a portion of leg A of fiber segment 24, and second depressor 22 imparts a bend 32 into a portion of leg B of fiber segment 24. Bend 28 includes a point of maximum curvature discontinuity at transition point 29, and bend 32 includes a point of maximum curvature discontinuity at transition point 33. Transition points 29 and 33 are adjacent adjustable clamp 26.

Both first and second depressors 20 and 22 preferably are adjustable in that each can slide towards and away from adjustable clamp 26. Sliding first depressor 20 toward clamp 26 decreases the cantilever length of leg A of fiber segment 24, thus increasing the curvature discontinuity at transition point 29. Conversely, sliding first depressor 20 away from clamp 26 increases the cantilever length of leg A, thus decreasing the curvature discontinuity at transition point 29. Sliding second depressor 22 toward and away from clamp 26 has a similar effect on leg B of fiber segment 24 and the curvature discontinuity at transition point 33.

As indicated above, increasing the curvature discontinuity at the transition point stimulates the transition effect and increases the transition loss, while decreasing the curvature discontinuity de-stimulates the transition effect and thus decreases the transition loss. In this manner, first and second depressors 20 and 22 can independently adjust the amount of coupling between diagonally opposite leg pairs A and D and B and C, respectively, from zero percent up to a practical maximum.

Preferably, first and second depressors 20 and 22 are keyed or otherwise operably associated with substrate 12, as would be known to one skilled in the art, so that the depressors can be freely adjusted without adversely affecting the optical alignment between injector fibers 14 and 16 and fiber segment 24. In a preferred embodiment, first and second depressors 20 and 22 can be silicon v-groove chips having a groove 23 on the bottom face thereof to accommodate first and second injector fibers 14 and 16, respectively, and a groove 25 on the upper face thereof functioning as a guide for fiber segment 24. See FIG. 4. Alternatively, first and second depressors 20 and 22 can be made of other materials, and either or both of grooves 23 and 25 can be omitted.

When switched to the off position, adjustable clamp 26 moves portion 30 of optical fiber 24 a predetermined distance from the on position, preferably in a direction away from substrate 12. This can extinguish the coupling in at least two ways. First, when in the off position, portion 30 of fiber segment can be located out of optical alignment with first injector fiber 14 and second injector fiber 16, thus extinguishing the coupling. Second, moving portion 30 of fiber segment 24 to the off position tends to flatten out the bends imparted to legs A and B of fiber segment 24 by first and second depressors 20 and 22, respectively. This effect can sufficiently reduce the curvature discontinuity at transition points 29 and 33 so as to destroy the transition effect and extinguish the coupling. The toggling distance between the on and off positions can be as little as one fiber diameter or less. Preferably, alignment groove 18 is deep enough so that portion 30 of optical fiber 24 remains located at least partially within groove 18 even when portion 30 of optical fiber 24 is in the off position.

Because first and second light injectors 14 and 16 are aligned with and pointed at each other in the device illustrated in FIG. 1, direct optical coupling between legs C and D could occur. Such direct coupling likely would be undesirable and difficult to control. In order to reduce such undesired direct coupling, adjustable clamp 26 must be long enough to assure that only a negligible fraction of the light injected from leg C couples directly across into leg D. Computer modeling suggests the clamp should be at least 6–7 mm long to prevent direct C-to-D coupling. Of course, some fraction of the light injected from leg C into fiber segment 24 can be extracted into leg D, if desired, by suitably adjusting depressor 22.

Optical fiber generally is supplied with a polymer coating 17 protecting the fiber's cladding. It is difficult to maintain the desired curvature discontinuity and, thus, the desired transition effect in a fiber having such a coating intact within the device because the fiber core tends to "creep" within the polymer coating over time. Therefore, it is desirable to remove such a coating from the section of optical fiber 24 between its points of contact with first and second depressors 20 and 22 and adjustable clamp 26, including portion 30 under adjustable clamp 26. The section of optical fiber 24 from which the polymer coating has been removed can be recoated with a thin coating (not shown) of a suitable rigid coating material to provide protection for the fiber. Preferably, this rigid coating material is a sol-gel which is index matched to the fiber cladding, as would be known to one skilled in the art. Because the relative diameters of optical fiber 24 and first and second injector fibers 14 and 16 can affect the necessary optical alignments, it may be necessary to prepare injector fibers 14 and 16 in the same manner as optical fiber 24 in order to maintain the necessary optical alignment. In addition, a non-rigid index matching material may be required in the optical path between the injector fibers and the respective transition points to ensure efficient coupling.

FIGS. 2A–2D show schematically four distinct operating modes offered by a coupler according to the present invention. In the configuration illustrated in FIG. 2A, both the A/D coupling and C/B coupling are active, and both are separately adjustable. In this mode, adjustable clamp 26 is positioned so that portion 30 of optical fiber 24 is in the on position, i.e., positioned in groove 18 and in alignment with first and second injector fibers 14 and 16. First and second depressors 20 and 22 are in first and second predetermined positions so as to impart first and second predetermined bends in legs A and B of optical fiber 24, thus effecting a predetermined amount of coupling between legs A/D and C/B, respectively.

Figure 2A:
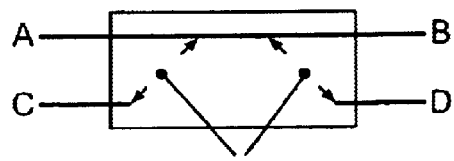
FIG. 2A illustrates a first operating mode of an optical coupler according to a preferred embodiment of the present invention.
Figure 2B:
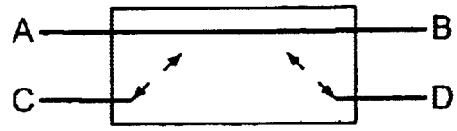
FIG. 2B illustrates a second operating mode of an optical coupler according to a preferred embodiment of the present invention.

In the "switched off" mode illustrated in FIG. 2B, adjustable clamp 26 is positioned so that portion 30 of optical fiber 24 is in the off position, i.e., out of optical alignment with both of first and second injector fibers 14 and 16 and/or positioned such that the transition effect is not stimulated at points 28 and 32 (see also FIG. 1). With clamp 26 so positioned, there is no coupling to or from legs C and D, and there is 100% coupling between legs A and B. The C/B and A/D coupling settings prior to switch off are retained, such that they are restored when the coupler is switched back on.

Figure 2C:
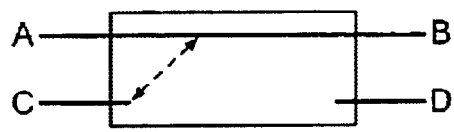
FIG. 2C illustrates a third operating mode of an optical coupler according to a preferred embodiment of the present invention.
Figure 2D:
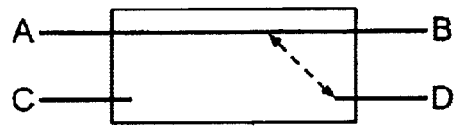
FIG. 2D illustrates a fourth operating mode of an optical coupler according to a preferred embodiment of the present invention.

FIG. 2C shows the configuration where A/D coupling is deactivated and C/B coupling is adjustable from zero to some maximum value. To deactivate the A/D coupling independent of the C/D coupling, second depressor 22 is moved sufficiently far from clamp 26 so that any bend imparted to leg B of fiber segment 24 is insufficient to stimulate the transition effect, thus not permitting any coupling between fiber segment 24 and injector fiber 16 (leg D of the device). FIG. 2D shows the corresponding situation when C/B coupling is deactivated and A/D coupling is adjustable.

Several four-port couplers according to the present invention can be ganged together side by side (not shown). For example, multiple identical couplers can be fabricated on a single substrate or holder, such as a silicon v-groove chip (not shown). In the simplest multiple-coupler implementation, a single common actuator would simultaneously switch all the couplers from the "switched on" condition illustrated in the FIG. 2A configuration above to the "switched off" condition illustrated in FIG. 2B. Similarly, a single common adjuster would adjust the C/B coupling simultaneously on all the couplers on the substrate, as in FIG. 2C above. Likewise for the A/D coupling adjustment of FIG. 2D above.

A coupler according to the present invention can be a small, self-contained, pre-manufactured device in which the coupler legs A, B, C, D are fiber pigtails. Such a device can be spliced to other fibers as part of a higher level system. With regard to size, a unit consisting of 12 identical, adjustable 4-port couplers could fit within a package approximately 50 mm long by 12 mm wide by 10–15 mm high. Such a unit would be small enough for installation on a standard rack-mount circuit card, and could include a manually operated on/off actuator and manually operated coupling adjusters. In a somewhat larger package, the device could incorporate remotely-operable actuators and adjusters.

Although the present invention has been described above as adjustable and switchable, a non-adjustable and non-switchable coupler could be built using many of the principles of the present invention. Such a coupler could be of very small physical size. For example, a non-adjustable, non-switchable 12-coupler unit could be about 4–5 mm high, 40 mm long, and 12 mm wide.

Figure 3:
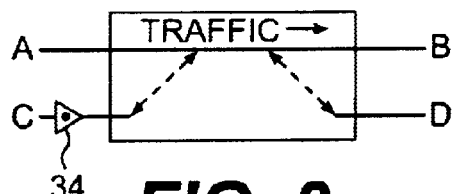
FIG. 3 illustrates, schematically, a four port coupler according to a preferred embodiment of the present invention configured to add wavelengths to a WDM system.

The non-invasive technology employed to realize a coupler according to the present invention allows such a coupler to be fabricated or installed on an active, traffic carrying fiber, without disrupting the existing traffic. In such an embodiment, fiber segment 24 shown in FIG. 1 would represent the traffic fiber. This capability allows, for example, the insertion of additional wavelengths onto a wavelength division multiplexed (WDM) system to increase capacity, without shutting the system down. For example, traffic fiber 24 could be carrying wavelengths in a WDM system, and first injector fiber 14, i.e., leg C of the coupler, could be used to insert additional wavelengths into the system. At the same time, second injector fiber 16, i.e., leg D, could be used as an extractor fiber to monitor the insertion process for equalizing levels, etc. As shown in FIG. 3, an optical amplifier 34 could be included on the injection leg to permit adjusting the levels of the injected wavelengths to match the pre-existing wavelengths on the fiber. The optical amplifier 34 would allow the insertion loss due to the transition bend on leg C to be very low (probably<0.01 dB).

In a similar way, the subject coupler could be applied to a traffic fiber at any accessible point along its length (without disrupting traffic) to "drop" a portion of the signal for rerouting or system monitoring.

In a similar application, the device could be applied to an active fiber at any point along its length for fiber diagnostic purposes. For example, optical time domain reflectometer (OTDR) signals could be inserted through leg C and/or leg D to check the condition of the fiber. In all of these applications, the insertion loss on continuous fiber A/B can be limited to no more than a few tenths of a dB, so traffic on the fiber is not adversely affected.

In alternate embodiment, a coupler according to the present invention need not have four-ports. For example, the present invention can be embodied as a three-port coupler having legs A,B, and C that can allow adjustable coupling between diagonally opposite legs, for example, legs C and B, and that can allow for complete de-coupling without affecting the foregoing adjustment. Other alternate embodiments are possible, as well.

The foregoing description is merely illustrative of a preferred embodiment of the present invention. Those skilled in the art will recognize that modifications and variations thereto can be implemented without departing from the spirit of the invention, the scope of which is limited only by the claims appended hereto.

We claim:

1. An apparatus for selectively exchanging light energy between a plurality of optical fibers, comprising:
    a first optical fiber;
    a second optical fiber;
    a first mechanism adapted to selectively toggle at least a portion of said first optical fiber between a first orientation relative to said second optical fiber and a second orientation relative to said second optical fiber; and
    a second mechanism adapted to selectively and adjustably impart a bend to a first portion of said first optical fiber, such that the light energy may be coupled substantially at the first portion of said first optical fiber.

2. The apparatus of claim 1 further comprising:
    a third optical fiber; and
    a third mechanism adapted to selectively and adjustably impart a bend to a second portion of said first optical fiber;
    said first mechanism further adapted to selectively toggle at least a portion of said first optical fiber between a first orientation relative to said third optical fiber and a second orientation relative to said third optical fiber.

3. An apparatus for selectively exchanging light energy between a first optical fiber, a second optical fiber, and a third optical fiber, comprising:
    means for positioning said first optical fiber and said second optical fiber in a predetermined orientation relative to each other;
    means for selectively toggling said third optical fiber between a first orientation relative to said first and second optical fibers and a second orientation relative to said first and second optical fibers;
    means for selectively effecting a bend in a first portion of said third optical fiber when said third optical fiber is in said first orientation relative to said first and second optical fibers; and
    means for selectively effecting a bend in a second portion of said third optical fiber when said third optical fiber is in said first orientation relative to said first and second optical fibers.

4. The apparatus of claim 3 wherein at least one of said first and second optical fibers further comprises a lens.

5. The apparatus of claim 3 wherein light energy can be selectively exchanged between said first and third optical fibers when said third optical fiber is in said first orientation relative to said first and second optical fibers.

6. The apparatus of claim 3 wherein light energy cannot be exchanged between said first and third optical fibers when said third optical fiber is in said second orientation relative to said first and second optical fibers.

7. The apparatus of claim 3 wherein light energy can be selectively exchanged between said second and third optical fibers when said third optical fiber is in said first orientation relative to said first and second optical fibers.

8. The apparatus of claim 3 wherein light energy cannot be exchanged between said first and third optical fibers when said third optical fiber is in said second orientation relative to said first and second optical fibers.

9. An apparatus for selectively exchanging light energy between a first optical fiber, a second optical fiber, and a third optical fiber, comprising:
    a substrate, said first optical fiber and said second optical fiber positioned on said substrate in a predetermined orientation;
    an adjustable clamp configured to selectively toggle said third optical fiber between a first orientation relative to said first and second optical fibers and a second orientation relative to said first and second optical fibers;
    a first coupling adjustor selectively and adjustably imparting a bend to a first portion of said third optical fiber when said third optical fiber is positioned in said first orientation relative to said first and second optical fibers; and
    a second coupling adjustor selectively and adjustably imparting a bend to a second portion of said third optical fiber when said third optical fiber is positioned in said first orientation relative to said first and second optical fibers.

10. The apparatus of claim 9 wherein light energy can be selectively exchanged between said first and third optical fibers when said third optical fiber is in said first orientation relative to said first and second optical fibers.

11. The apparatus of claim 9 wherein light energy cannot be exchanged between said first and third optical fibers when said third optical fiber is in said second orientation relative to said first and second optical fibers.

12. The apparatus of claim 9 wherein light energy can be selectively exchanged between said second and third optical fibers when said third optical fiber is in said first orientation relative to said first and second optical fibers.

13. The apparatus of claim 9 wherein light energy cannot be exchanged between said first and third optical fibers when said third optical fiber is in said second orientation relative to said first and second optical fibers.

14. The apparatus of claim 9 wherein said substrate comprises at least one groove and wherein at least one of said first and second optical fibers is positioned in said at least one groove.

15. The apparatus of claim 9 wherein said first coupling adjustor comprises a groove and wherein said first optical fiber is positioned in said groove.

16. The apparatus of claim 9 wherein said first optical fiber is configured to direct light at said bend imparted to said first portion of said third optical fiber.

17. The apparatus of claim 16 wherein said first optical fiber further comprises a lens, said lens being configured to focus light at said bend imparted to said first portion of said third optical fiber.

18. A method for selectively exchanging light energy between a plurality of optical fibers, comprising the steps of:

placing a first optical fiber in a first predetermined spatial relationship with respect to a second optical fiber;

imparting a bend to a first portion of said first optical fiber at a first predetermined location relative to said second optical fiber; and selectively toggling said first optical fiber between said first predetermined spatial relationship with respect to a second optical fiber and a second predetermined spatial relationship with respect to a second optical fiber, such that the light energy may be coupled substantially at the first portion of said first optical fiber.

19. The method of claim 18 further comprising the steps of:

placing said first optical fiber in a first predetermined spatial relationship with a third optical fiber;

imparting a bend to a second portion of said first optical fiber at a second predetermined location relative to said third optical fiber; and selectively toggling said first optical fiber between said first predetermined spatial relationship with respect to said third optical fiber and said second predetermined spatial relationship with respect to said third optical fiber.

* * * * *